(12) United States Patent
Phillips

(10) Patent No.: US 7,367,757 B2
(45) Date of Patent: May 6, 2008

(54) ELECTRIC DRILL WITH MODIFIED BIT GRIPPING ASSEMBLY

(76) Inventor: Sean Peter Phillips, 35 Walsh Avenue, Maroubra, New South Wales, 2035 (AU)

( * ) Notice: Subject to any disclaimer, the term of this patent is extended or adjusted under 35 U.S.C. 154(b) by 176 days.

(21) Appl. No.: 11/313,950

(22) Filed: Dec. 22, 2005

(65) Prior Publication Data
US 2006/0147283 A1    Jul. 6, 2006

(30) Foreign Application Priority Data
Dec. 31, 2004    (AU) .............................. 2004907387

(51) Int. Cl.
*B23B 45/00* (2006.01)
(52) U.S. Cl. .................... 408/35; 173/46; 173/214; 7/158; 408/117; 408/124
(58) Field of Classification Search ............... 408/35, 408/117, 124; 173/214, 46; 7/165, 158; 279/14
See application file for complete search history.

(56) References Cited
U.S. PATENT DOCUMENTS

| | | | | |
|---|---|---|---|---|
| 2,303,565 A | * | 12/1942 | Luna ........................ | 173/214 |
| 2,359,161 A | * | 9/1944 | Scates ....................... | 408/139 |
| 2,435,354 A | * | 2/1948 | Hotchkiss, Jr. et al. ..... | 408/117 |
| 2,738,691 A | * | 3/1956 | Schwab ..................... | 408/117 |
| 2,919,609 A | * | 1/1960 | Klingbeil ................... | 408/117 |
| 4,932,294 A | * | 6/1990 | Chang ....................... | 81/490 |
| 5,573,358 A | * | 11/1996 | Gobbers et al. ............ | 408/35 |
| 6,506,002 B1 | * | 1/2003 | Cummins ................... | 408/35 |
| 6,715,969 B2 | * | 4/2004 | Eriksen ..................... | 408/35 |
| 2007/0098507 A1 | * | 5/2007 | Whitehead ................. | 408/35 |

FOREIGN PATENT DOCUMENTS

| | | | |
|---|---|---|---|
| AU | 631615 A1 | * | 12/1992 |
| DE | 4340740 A1 | * | 6/1995 |
| GB | 633408 | * | 12/1949 |

* cited by examiner

*Primary Examiner*—Daniel W. Howell

(57) ABSTRACT

An electric drill (10) has a drive assembly (31, 70), and a pivot head (32) having first and second bit gripping assemblies (14, 22) disposed at 90 degrees to each other. The electric drill (10) also includes means for adjusting the position of the bit gripping assemblies (14, 22) relative to the drive assembly (31, 70) by pivoting the head (32) through 90 degrees, whereby a selected one of the bit gripping assemblies is operatively engaged to the drive assembly. The position adjusting means may include a movable locking sleeve (36) which, in a first position, allows the drive assembly to operatively engage the selected bit gripping assembly and, in a second position, allows the drive assembly to disengage the selected bit gripping assembly.

8 Claims, 4 Drawing Sheets

Figure 1:
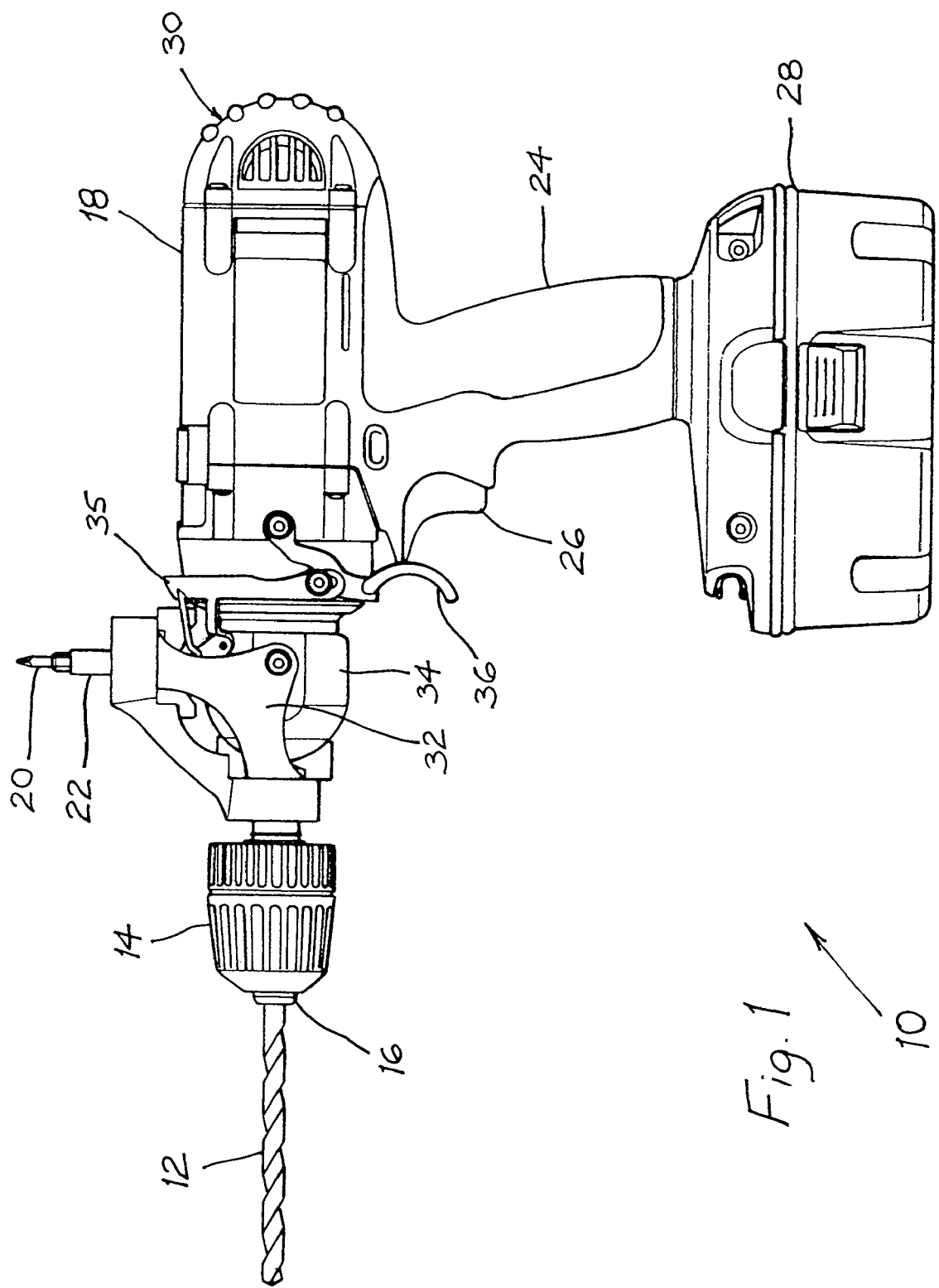

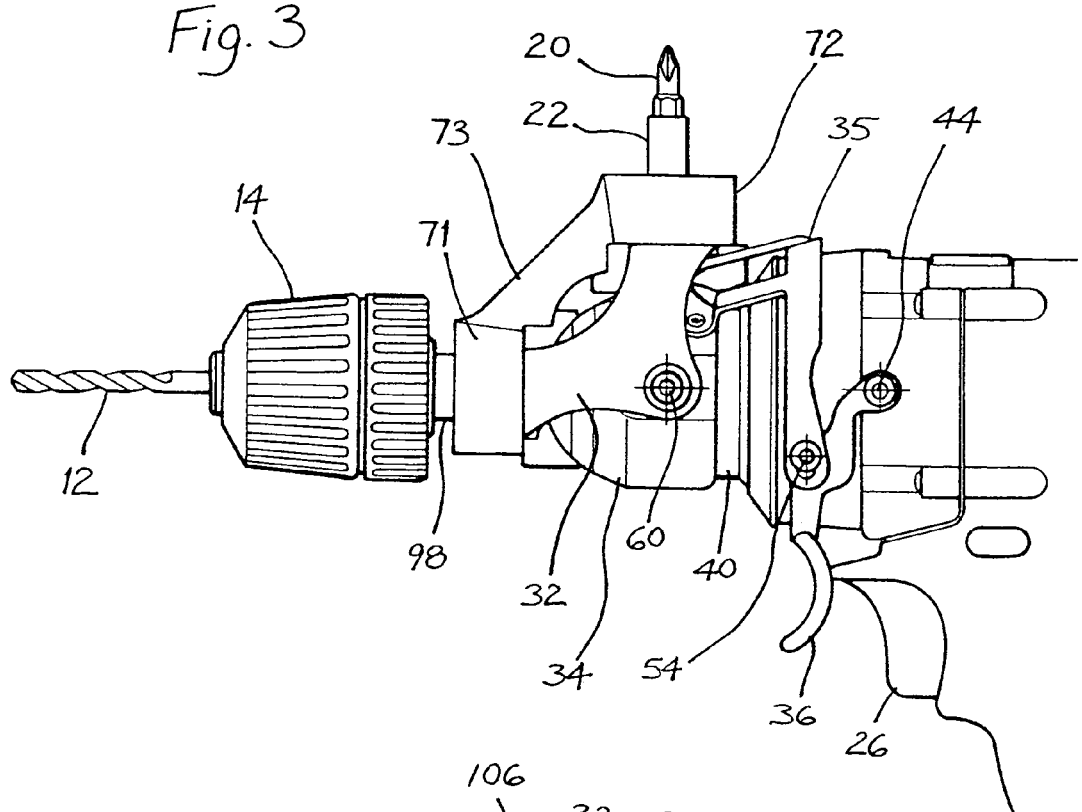
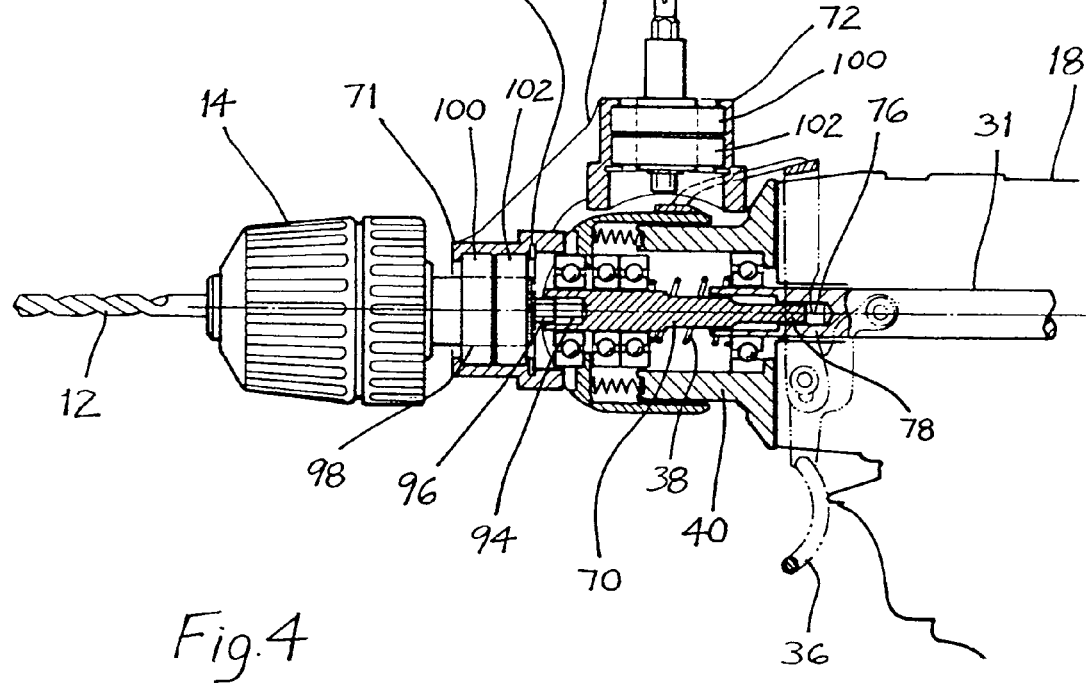

ELECTRIC DRILL WITH MODIFIED BIT GRIPPING ASSEMBLY

FIELD OF THE INVENTION

The present invention relates to improvements in electric drills and, in particular, to a portable electric drill having a modified bit gripping and drive assembly.

BACKGROUND OF THE INVENTION

Building contractors in the construction industry, and especially carpenters, are often required to install a large number of fasteners in walls or other reference surfaces. Unless the fastener is self-tapping, or splitting of the surfaces is tolerated, a pilot hole must first be drilled in the reference surface before the fastener is driven therethrough. This is normally achieved by using two electric drills, or by using a single electric drill and firstly using a drill bit fitted to the chuck of the electric drill to drill the pilot hole, and then removing the drill bit and fitting a screw bit to the chuck or removing the chuck altogether and installing a bit holder with fitted screw bit to the drive assembly of the electric drill. This is a time consuming task, especially in circumstances where the contractor must install a large number of fasteners, one after the other, each first requiring a pilot hole. Time is wasted in changing repeatedly between drill bit and screw bit, and the contractor may suffer back strain in bending over frequently to change bits.

U.S. Pat. No. 4,810,916 discloses a rotary power tool having dual heads or bit gripping outputs extending in opposite (or 180 degrees) directions from a central body of the power tool. One output is for a screwdriver bit and the other output is for a drill bit. Both of the outputs are in fixed angular position with reference to the central body. A retractable guard covers the drill bit when not in use. The guard is retracted by the free hand of the user not gripping the central body to expose the drill bit when it is required for use. If, after use, the user forgets or carelessly chooses not to cover the drill bit with the guard by extending it thereover, the drill bit may present a risk of injury to the user as it faces the user's body when the screwdriver bit is being used. The structure of the power tool body (incorporating the handle) is also very different to that of the body of conventional rotary power tools or electric drills.

Australian Patent No. 631,615 discloses a hand held power tool having dual bit gripping outputs which extend in opposite directions from a central body, and which engage respective bits, the outputs being rotatable about 180 degrees to selectively bring either bit to a work station at a forward end of the tool. There is a first manually operated switch for controlling the power supply to the tool, and a second manually operated switch for activating an automated mechanism which turns the head 180 degrees to interchange the positions of the bits. An energy storage means in the form of tensioned springs provides energy for turning of the head, the energy being released by single handed operation of the switches. Whilst enabling the user to keep one hand free when changing the position of the bits, the inclusion of an automated mechanism adds to the structural complexity and weight of the tool.

GB Patent No. 1,357,007 discloses a hand held power tool having a chuck at each end of a rotatable drill head. The drill head is manually turnable through 180 degrees with the use of two hands to allow the chucks to be interchanged at the work site. Because the chuck not being used faces the user's body when the other chuck is in operation at the work site, a guard is provided to protect the user from contacting the chuck, and any bit gripped thereby, not in use. The provision of guards to protect the user from contact with bits that, when not in use, face the user" body, also adds to the structural complexity and weight of the tool.

The present inventor has found that, where installation of a plurality of fasteners requires the drilling of a pilot hole for each fastener, a substantial amount of time can be saved, and less physical exertion is required, if, instead of removing the drill bit from the chuck of the electric drill and then fitting the screw bit to the electric drill, a contractor uses an electric drill having a bit gripping and drive assembly modified so as to operatively support both the drill bit and the screw bit and to allow use of either bit by trigger release and gravity controlled positional adjustment of the bits through 90 degrees that only requires the use of the one hand holding the electric drill. In this way, the need for a guard is eliminated as the bit not in use does not face the user's body. Furthermore, the provision of manual positional adjustment, rather than automated positional adjustment by complex spring loaded or other energy storage means, does not add significantly to the weight of the tool and makes it relatively easier to service and repair. Also, the user may use his other free hand to maintain his hold on a ladder or for other purposes.

OBJECTS AND SUMMARY OF THE INVENTION

It is an object of the present invention to provide an electric drill having the aforementioned advantages over the prior art, and that is easy to use with one hand and is relatively inexpensive.

According to one aspect of the present invention, there is provided an electric drill comprising a drive assembly, a head having first and second bit gripping assemblies disposed at 90 degrees to each other, and means for adjusting the position of the bit gripping assemblies relative to the drive assembly by pivoting the head through 90 degrees, whereby a selected one of the bit gripping assemblies is operatively engaged to the drive assembly.

Preferably, the position adjusting means includes a movable locking sleeve which, in a first position, allows the drive assembly to operatively engage the selected bit gripping assembly and, in a second position, allows the drive assembly to disengage the selected bit gripping assembly.

It is preferred that the locking sleeve is movable by sliding reciprocatingly over a locking sleeve guide secured to a rear body of the drill.

In a preferred form, the position adjusting means includes a harness which is secured to the locking sleeve, and a lever which is pivotally connected to the body and engaged to the harness such that pulling of the lever causes the harness to slide the locking sleeve rearwardly towards the body, thereby causing the drive assembly to disengage the selected bit gripping assembly.

The lever is preferably adapted to be pulled by a finger of the user's hand gripping a handle of the electric drill, and the electric drill may be portable.

Preferably, the locking sleeve is adapted to be slid rearwardly sufficiently to allow the head to pivot through 90 degrees under the influence of gravity.

According to another aspect of the present invention, there is provided an electric drill comprising a drive assembly, a head having first and second bit gripping assemblies disposed at 90 degrees to each other, and a selective engagement assembly for adjusting the position of the bit gripping assemblies relative to the drive assembly by pivoting the head through 90 degrees, whereby a selected one of the bit gripping assemblies is operatively engaged to the drive assembly.

BRIEF DESCRIPTION OF THE DRAWING FIGURES

Figure 2:
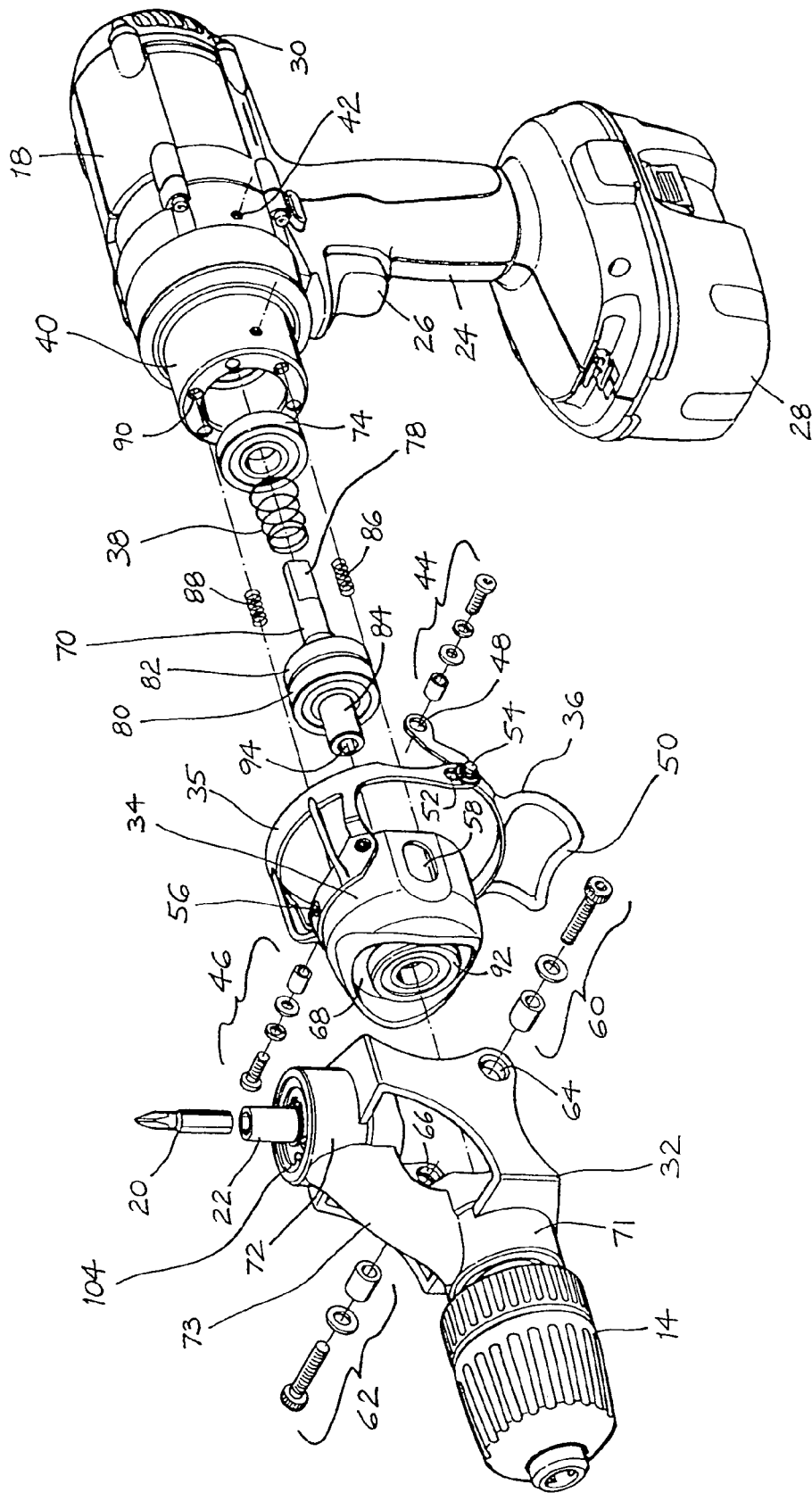
Figure 5:
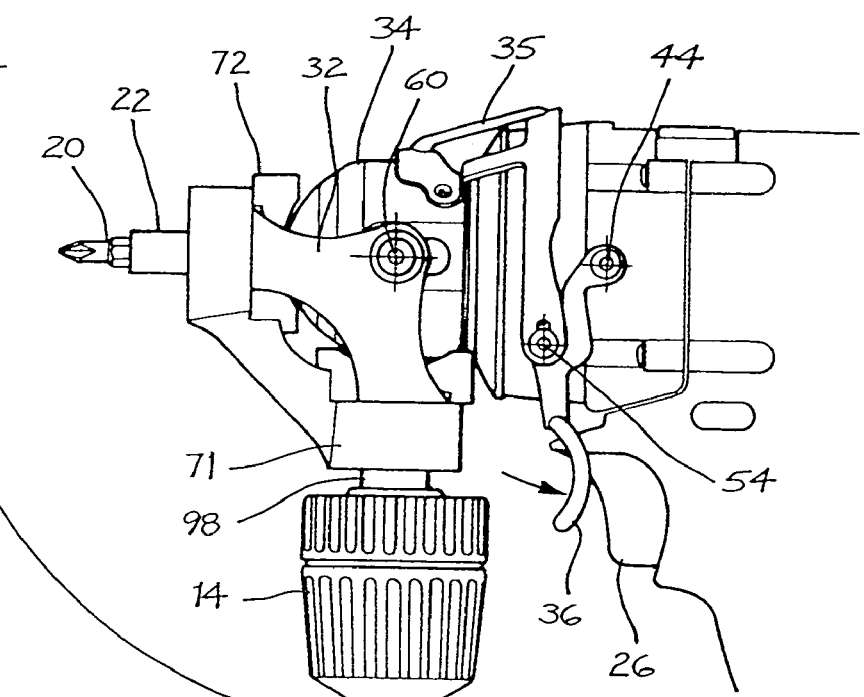
Figure 6:
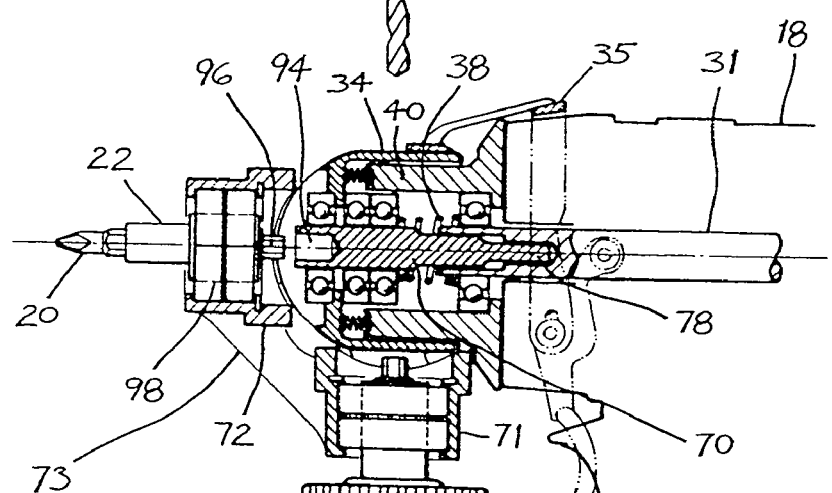

FIG. 1 is side view of a portable electric drill according to a preferred embodiment of the present invention, FIG. 2 is a partly disassembled perspective view of the portable electric drill shown in FIG. 1 (without the drill bit), FIG. 3 is a side view of a head with first and second bit gripping assemblies, and position adjusting means connected to a forward part of the rear body of the electric drill shown in FIG. 1, and showing a drill bit gripped by a chuck at the operative position, with the lever not being pulled, FIG. 4 is a view similar to that of FIG. 3 but including a cross sectional view of both the head with first and second bit gripping assemblies and a forward part of the drive assembly, with the drive assembly shown engaged to the bit gripping assembly at the operative position, FIG. 5 is a view similar to that of FIG. 3 but showing a screw bit gripped by a bit holder at the operative position, with the lever being pulled, and FIG. 6 is a view similar to that of FIG. 5 but including a cross sectional view of both the head with first and second bit gripping assemblies and a forward part of the drive assembly, with the drive assembly shown disengaged from the bit gripping assembly at the operative position.

BEST MODE AND OTHER EMBODIMENTS OF THE INVENTION

As shown in FIG. 1, a portable electric drill 10 has a drill bit 12 gripped by a quick release chuck 14 having a three jaw holder 16. The chuck 14 is engaged to a drive assembly, only a forward part of which is shown in FIGS. 2, 4 and 6. Disposed at 90 degrees to the quick release chuck 14 is a screw bit 20 gripped by a bit holder 22. There are means (to be hereinafter described in detail with reference to FIGS. 2 to 6) for adjusting the position of each of the chuck 14 and bit holder 22 relative to the drive assembly, whereby a selected one of these two preferred bit gripping assemblies may be operatively engaged to the drive assembly.

The drill 10 also includes a handle 24 with a trigger 26 for actuating the drive assembly, and a battery pack 28 for supplying power thereto. The body 18 houses an electric motor (not shown) at its rearward end 30, a gear box and torque clutch assembly (not shown), and a main drive shaft 31 (partly shown in FIGS. 4 and 6) between the gear box and the remaining parts of the drive assembly shown in FIG. 2.

Both the chuck 14 and the bit holder 22 are removably fitted to separate mounting locations of a pivot head 32 which can be pivoted (or swivelled) through 90 degrees (as shown in FIGS. 3 to 6) when released from the grip of a movable locking sleeve 34. A finger of the user's hand gripping the handle 24 may pull back on a lever 36 which causes a harness 35 to slide the locking sleeve 34 rearwardly (towards the rear end 30) to an extent necessary to allow the pivot head 32 to be free to pivot through 90 degrees under the influence of gravity. This is because rearward sliding of the locking sleeve 34 causes disengagement of the drive assembly from either the chuck 14 or bit holder 22 fitted to the pivot head 32 at the forward end of the drill. Release of the lever 36 after the selected bit gripping assembly has been located at the forward end allows a coil spring 38 (as shown in FIGS. 2, 4 and 6) to cause re-engagement of the drive assembly with the selected bit gripping assembly Reference will now be made to the disassembled (or exploded) view in FIG. 2 for a more detailed description of the preferred electric drill of the present invention.

There is a locking sleeve guide 40 securably mounted at a forward end of the body 18. The body 18 has a pair of opposed mounting holes (only mounting hole 42 shown in FIG. 2) within which are secured respective pivot assemblies 44, 46 for the lever 36. The pivot assemblies 44, 46 engage respective pivot apertures (only pivot aperture 48 shown in FIG. 2) of the lever 36. The lever 36 has a finger receiving portion 50 adapted to allow a finger of the user's hand gripping the handle 24 to be received thereon.

The harness 35 has a pair of opposed adjuster slots (only slot 52 shown) which engage respective outward extensions or bosses (only outward extension 54 shown) of the lever 36 with a washer and circlip. The harness 35 is securably mounted to the locking sleeve 34 by screws 56.

The locking sleeve 34 has a pair of opposed guide tracks in the form of elongated slots (only guide track 58 shown) which receive therethrough respective pivot assemblies 60, 62 for the pivot head 32. The pivot assemblies 60, 62 engage respective pivot apertures 64, 66 of the pivot head 32. The locking sleeve 34 is thus able to slide rearwardly over the locking sleeve guide 40 upon a finger pulling back on the lever 36 without the pivot head 32 also sliding rearwardly. The locking sleeve 34 has an annular flange portion 68 which engages the drive assembly and causes a slideable drive shaft 70 to slide rearwardly in concert with the locking sleeve 34. Rearward sliding of the locking sleeve 34 and drive shaft 70 is against the forward bias or tension of the coil spring 38, but allows the drive assembly to disengage the bit gripping assembly. The pivot head 32 remains pivotally connected to the stationary locking sleeve guide 40, but as the pivot head is now no longer engaged to the drive assembly, the pivot head 32 is free to pivot, together with the bit gripping assemblies 14, 22 fitted thereto, through 90 degrees under the influence of gravity.

The pivot head 32 has a pair of bearing housings 71, 72 for the chuck 14 and the bit holder 22 respectively, the bearing housings 71, 72 being supported by arm portions extending substantially at right angles from the pivot apertures 64, 66. There is a strengthening bridge 73 between the bearing housings 71, 72.

If after use of the drill bit 12 the user holds the electric drill 10 horizontally (as shown in FIGS. 1 to 3), gravity will cause the disengaged pivot head 32 to pivot through 90 degrees so that the screw bit 20 gripped by the bit holder 22 will be relocated to the forward end of the drill 10 (see FIGS. 5 and 6) for subsequent use with the drill bit 12 pointing downwardly. If, after use of the screw bit 20, the user holds the electric drill 10 vertically with the forward end thereof pointing downwardly, gravity will cause the disengaged pivot head 32 to pivot through 90 degrees in the opposite direction so that the drill bit 12 gripped by the chuck 14 will be relocated to the forward end of the electric drill 10 for subsequent use. Some slight deviation of the position of the electric drill away from vertical may be required in order for the drill bit 12 to align correctly with the drive assembly, given the effect that the respective weights of the two bit gripping assemblies has on the centre of gravity of the combined pivot head and bit gripping assemblies. When the selected bit gripping assembly is relocated to the forward end of the electric drill 10 and is correctly aligned with the drive assembly, release of the lever 36 allows the drive assembly to re-engage the bit gripping assembly under the forward bias of the coil spring 38.

The drive assembly will now be described in detail. A guide bearing 74 is secured against an internal shoulder of the locking sleeve guide 40 and supports against its inner race a forward end of the main drive shaft 31 (see FIGS. 4 and 6) which is adapted to be rotatably driven by the gear box in the body 18. The forward end of the main drive shaft 31 has a stepped slot 76 within which is slideably engaged a keyed end portion 78 of the slideable drive shaft 70 such that rotation of the main drive shaft 31 causes direct rotation of the slideable drive shaft 70. The slideable drive shaft 70 is adapted to slide between a first position (as shown in FIG. 4) where the drive assembly is engaged to the bit gripping assembly and the keyed end portion 78 only partly penetrates the stepped slot 76, and a second position (as shown in FIG. 6) where the drive assembly is disengaged from the bit gripping assembly and the keyed end portion 78 fully penetrates the stepped slot 76. There are a pair of thrust bearings 80, 82 which rotatably support an enlarged tubular forward portion 84 of the slideable drive shaft 70. There is a circlip (not shown) engaged to the shaft 70 between the bearings 80, 82.

The coil spring 38 surrounds the slideable drive shaft 70 between the rearwardmost thrust bearing 82 and the stationary guide bearing 74 and so provides a spring resistance to the rearward sliding movement of the locking sleeve 34 over the locking sleeve guide 40. A plurality of smaller coil springs (only springs 86, 88 shown) are engaged between the front face of the locking sleeve guide 40 (where they are each snugly supported at one end within the depressions 90) and the rear face of the annular flange portion 68 of the locking sleeve 34, and these springs 86, 88 also provide a spring resistance to rearward sliding movement of the locking sleeve 34 over the locking sleeve guide 40. A locating bearing 92 is located by press fitting its outer race against a shoulder of the annular flange portion 68 of the locking sleeve 34 and also rotatably supports the slideable drive shaft 70 centrally through the locking sleeve 34. The forward portion 84 of the slideable drive shaft 70 has an internal hexagonal bore 94 within which is engaged a hexagonal key 96 of a bit gripping assembly drive shaft 98 when the slideable drive shaft 70 is in the first position (as shown in FIG. 4). The internal hexagonal bore 94 is disengaged from the hexagonal key 96 of the bit gripping assembly drive shaft 98 when the slideable drive shaft 70 is in the second position (as shown in FIG. 6).

An enlarged tubular portion of the bit gripping assembly drive shaft 98 is rotatably supported by a pair of pivot head bearings 100, 102 located in a respective bearing housing 71, 72 of the pivot head 32. There is a locking circlip 104 (shown in FIG. 2) engaged against the forward surface of the bearing 100 and a locking circlip 106 (shown in FIGS. 4 and 6) engaged against the rear surface of the bearing 102 to prevent the bearings 100, 102 falling out of their respective bearing housing 71, 72.

Use of the electric drill described above would provide many advantages to the user. Two significant advantages are that a substantial amount of time is saved, and less physical exertion is required, when installing a large number of fasteners, by simply pivoting the position of the head through 90 degrees to bring the required bit gripping assembly into operational engagement with the drive assembly, rather than (as is currently the common practice in the art) changing repeatedly between drill bit and screw bit on the one bit gripping assembly of the electric drill when installing a large number of fasteners. As the head can be pivoted through 90 degrees as a result of operation of a simple trigger release mechanism that allows pivotal motion under gravity, rather than by the more complex energy storing means that is a feature of the power tool of earlier Australian Patent No. 631,615, the weight of the electric drill of the present invention can be kept low and comparable to conventional electric drills having a single bit gripping assembly.

In circumstances where it is considered desirable to promote user safety and drill bit protection and isolation, a light weight casing or guard may be mounted to the handle of the electric drill. The casing may have a mouth for admitting therethrough the chuck and drill bit gripped thereby when these are not required for use.

It will be readily apparent to persons skilled in the art that various modifications may be made in details of design and construction of the electric drill described above without departing from the scope or ambit of the present invention.

What is claimed is:

1. An electric drill comprising a drive assembly, a head having first and second bit gripping assemblies disposed at 90 degrees to each other, and means for adjusting the position of the bit gripping assemblies relative to the drive assembly by pivoting the head through 90 degrees, whereby a selected one of the bit gripping assemblies is operatively engaged to the drive assembly, wherein the position adjusting means includes a movable locking sleeve which, in a first position, allows the drive assembly to operatively engage the selected bit gripping assembly and, in a second position, allows the drive assembly to disengage the selected bit gripping assembly, and wherein the locking sleeve is movable by sliding reciprocatingly over a locking sleeve guide secured to a rear body of the drill.

2. The electric drill of claim 1 wherein the position adjusting means includes a harness which is secured to the locking sleeve, and a lever which is pivotally connected to the body and engaged to the harness such that pulling of the lever causes the harness to slide the locking sleeve rearwardly towards the body, thereby causing the drive assembly to disengage the selected bit gripping assembly.

3. The electric drill of claim 2 wherein the lever is adapted to be pulled by a finger of the user's hand gripping a handle.

4. The electric drill of claim 3 wherein the drive assembly includes a slideable drive shaft which is adapted to slide rearwardly in concert with the locking sleeve.

5. The electric drill of claim 4 wherein the position adjustment means includes a coil spring which, after release of the lever by the finger, causes the drive assembly to engage the selected bit gripping assembly.

6. The electric drill of claim 5 wherein the head is pivotally connected to the locking sleeve guide, and a pair of opposed pivoting assemblies for the head are received through respective guide tracks formed in the locking sleeve.

7. The electric drill of claim 1 wherein the first bit gripping assembly is a chuck for a drill bit, and the second bit gripping assembly is a bit holder for a screw bit.

8. The electric drill of claim 1 further including a battery power supply whereby the drill is portable.

* * * * *